United States Patent [19]
Boettner et al.

[11] 3,755,606
[45] Aug. 28, 1973

[54] APPARATUS FOR MELTING THERMOPLASTIC MATERIAL

[75] Inventors: George B. Boettner; Paul F. Spremulli, both of Corning, N.Y.

[73] Assignee: Corning Glass Works, Corning, N.Y.

[22] Filed: Oct. 2, 1972

[21] Appl. No.: 293,841

[52] U.S. Cl. .................................................. 13/6
[51] Int. Cl. ............................................. C03b 5/02
[58] Field of Search ..................................... 13/6

[56] References Cited
UNITED STATES PATENTS
3,524,206 8/1970 Boettner et al. ........................ 13/6
2,863,932 12/1958 Gell et al. ............................... 13/6

Primary Examiner—Roy N. Envall, Jr.
Attorney—Clarence R. Patty, Jr., and Ernst H. Ruf

[57] ABSTRACT

An improvement in the melting zone of a furnace, having a plurality of spaced and immersed electrodes for melting and refining thermoplastic material, wherein there is incorporated, above the electrodes and not in contact with the molten material, means for deflecting raw batch away from the vicinity of the electrodes and for substantially preventing incompletely-melted batch from being convected toward the vertical furnace wall area closest to the ends of the electrodes, thereby minimizing the downward convection of the raw or partially-melted batch in the vicinity of this furnace wall area. If desired, the deflector means can also have incorporated therein radiant heating means for maintaining a small pool of molten material directly above the electrodes.

8 Claims, 16 Drawing Figures

PATENTED AUG 28 1973 3,755,606

APPARATUS FOR MELTING THERMOPLASTIC MATERIAL

BACKGROUND OF THE INVENTION

1. Field of the Invention

The field to which this invention pertains is that of furnaces or melting tanks, and more particularly to improvements relating to batch deflector means for use with immersed electrodes.

The invention is described in connection with the melting of thermoplastic materials in furnaces of the type shown and described in U.S. Pat. No. 3,524,206 to Boettner et al. (also assigned to the assignee of this invention), although not restricted thereto. For a more detailed discussion of the mode of operation of the above-referred-to furnace see column 2 lines 37 to 72, column 3, and column 4 lines 1 to 31 of said patent, which is incorporated herein by reference. A further control system for the above-referred-to furnace is set forth in U.S. Pat. No. 3,636,227 to McQuaid (also assigned to the assignee of this invention).

2. Prior Art

While the prior art Boettner et al. furnace produced glass of excellent quality, the electrodes, by being flush-mounted with the furnace walls, caused rather rapid refractory wear in this area. The use of axially immersed rod electrodes produced a noticeable increase in refractory life, however when the rod electrodes were immersed more than a nominal distance, the resulting convection currents caused a deleterious condition in that cold or partially-melted batch material was conveyed down the furnace wall near the electrodes and produced unsatisfactory glass. While this problem can be solved by either increasing the electrode temperature and/or reducing the furnace pull rate, neither of these solutions is satisfactory from an economic standpoint. A correct solution should allow a lower temperature operation (for maximum refractory life) with no decrease in pull rate. Thus, the main objects of this invention are to prevent raw batch from entering the area in the vicinity of the furnace wall behind the electrodes and also to divert the convection currents to keep them from carrying partially-melted batch into this area.

In all-electric melting tanks, generally the entire exposed horizontal surface is substantially covered with batch material which among other things helps to reduce the heat loss from the glass melt. In order to reduce this heat loss to a minimum and to help reduce the excessive abrasion of the furnace walls by the solid batch materials it is known in the prior art, such as in U.S. Pat. No. 2,863,932 to Gell et al., to use inwardly extending sill blocks above the normal surface level of the molten glass surface all around the sidewalls of the furnace to prevent the raw batch from directly contacting the sidewalls.

However, Gell et al. contains no teaching of keeping batch from entering the area in the vicinity of the furnace wall behind the electrodes. Furthermore no reference is made to convection currents and the electrodes are disposed close to the bottom of the furnace.

It is also known to use inclined surface portions on the furnace walls to help in the control of convection currents, such a portion being shown in U.S. Pat. No. 3,378,618 to Vach et al.

However, Vach et al., which shows a furnace having the melting zone separated from the refining zone by means of a separatory wall, contains no teaching of diverting the convection current from carrying partially-melted batch into the area behind the electrodes.

In U.S. Pat. No. 1,880,540 to Wadman in FIG. 1 there is shown a shelf extending from the furnace wall above the electrode. This shelf, which is in contact with the molten glass, is said to protect the electrode from strains which might be imposed upon it if batch were dropped directly on it. It is also stated that the shelf prevents unmelted glass batch, which is described as floating like an ice-berg in the tank, from hitting the electrode. In Wadman, wherein the refractory shelf is in contact with the molten glass, there is no teaching of how the batch is added to the furnace or how the melting process takes place. In the improved furnace of this invention there is no problem of electrode strain from batch additions, nor does the batch float like an iceberg.

SUMMARY OF THE INVENTION

This invention solves the previously-mentioned problems by providing an improved apparatus for melting thermoplastic material.

The present invention actually permits an increased melting rate, at a decreased furnace temperature, while significantly increasing the refractory life of the furnace walls. This is accomplished by the use of a batch deflector, which also serves as a convection divertor, generally in the form of a block of refractory material that is installed above the molten glass line, directly vertically above each electrode or grouping of electrodes in the uppermost tier of the electrodes in the case of horizontal electrodes. These deflector means, preferably have a width dimension greater than that of the electrodes. If desired, one deflector means may be used with a grouping of adjacent electrodes, with the width dimension of the deflector being at least as large as the center-center distance of the outer-most ones of the electrodes.

In summary, the improvement comprises, the combination of a melting furnace having a plurality of immersed electrodes, with means, not in contact with the molten material, for both deflecting raw batch away from the electrodes and for substantially preventing incompletely-melted batch from being convected toward the furnace wall area where the electrodes either emerge therefrom or are disposed substantially vertical thereto, thereby minimizing the downward convection of the raw or incompletely-melted batch in the vicinity of said furnace wall area. The deflector means may also have incorporated therein radiant heating means for maintaining a small pool of molten material in the area directly above the electrode(s) to prevent any partially-melted batch, which may find its way into this area, from being convected downwardly near the furnace wall area. These deflector means may be with horizontal and vertical type melting furnaces in both vertical and horizontally disposed positions.

DESCRIPTION OF THE PREFERRED EMBODIMENTS

Figure 2:
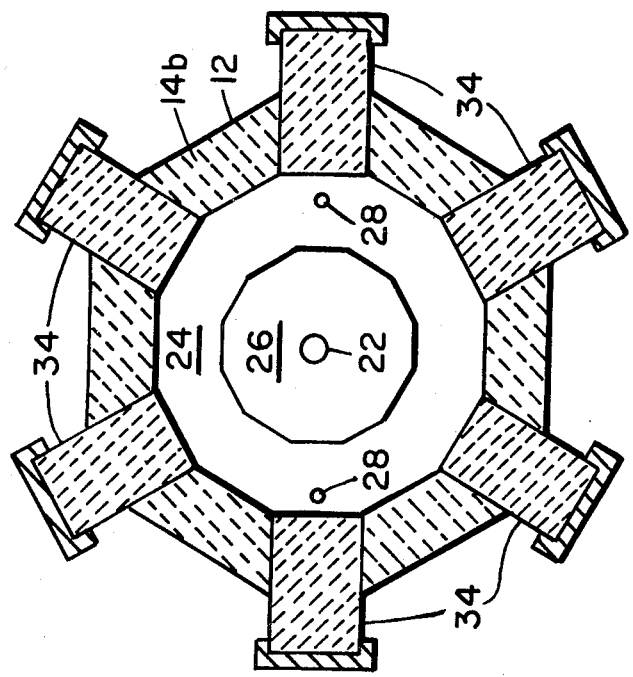
FIG. 2 which is a sectional view taken on line 2—2 of FIG. 1, illustrates the horizontal cross-section of the prior art tank (with the molten glass removed for the sake of clarity).
Figure 1:
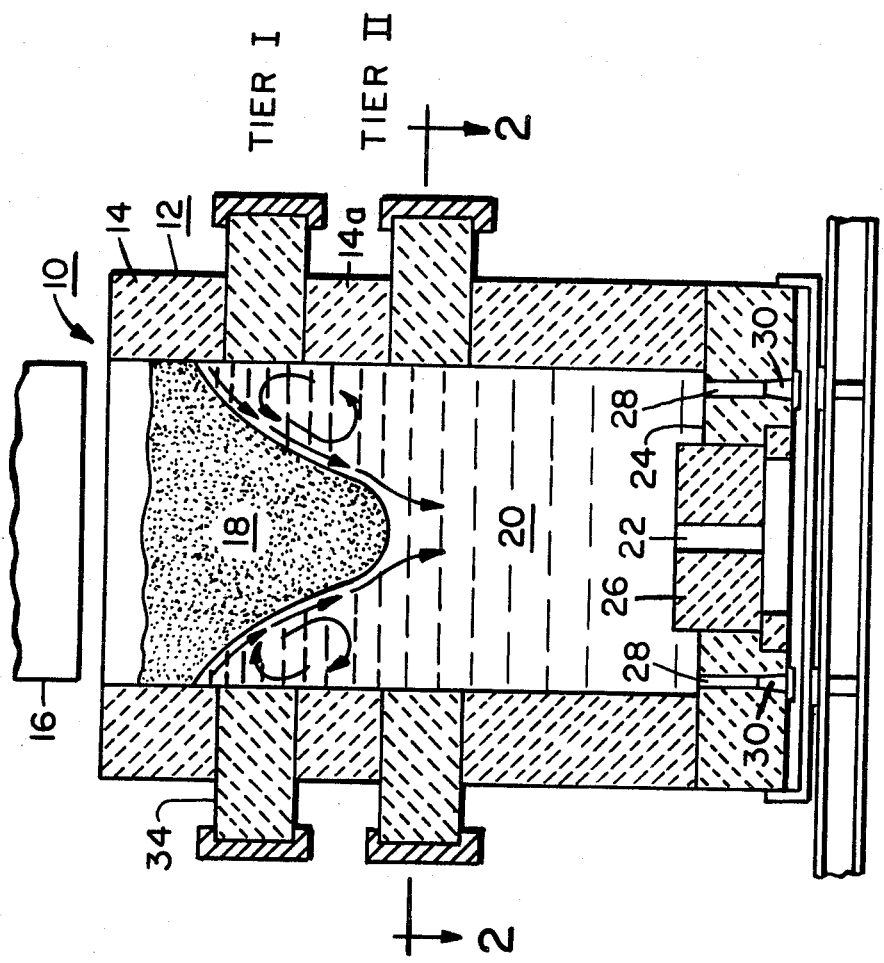
FIG. 1 is a vertical sectional view of a prior art electric melting tank or furnace that is in the process of melting a batch of material and utilizes flush-mounted wall electrodes.

Referring now to the drawings in detail, FIGS. 1 and 2 illustrate a melting tank or furnace known in the prior art (see U.S. Pat. No. 3,524,206 to Boettner et al.). Furnace or tank 10 comprises a vertical container 12 formed of conventional refractory materials and has an inner generally vertically segmented sidewall 14 which, in horizontal cross-section (FIG. 2), forms a multisided polygon, thus approximating the configuration of a cylinder. For ease of understanding, sidewall 14 may be defined as consisting of alternate vertical electrode-containing wall segments 14a and non-electrode or non-powered wall segments 14b. Batch is fed into furnace 10 through the top of the furnace by means of a batch feeder 16, which may be simply a perforate container having means for agitating the batch, with the batch forming a batch cover 18 that preferably completely covers the bath of a molten thermoplastic material 20, such as glass. The batch is preferably continuously fed into furnace 10, and molten glass 20 is preferably continuously withdrawn through an outlet 22 in the center of the bottom wall 24. Outlet 22 is formed in a raised central portion 26 of bottom wall 24, thus forming an annular depression around the periphery of the bottom wall of the furnace, which acts as a sump and has drains 28, normally capped by plugs 30, extending therethrough.

As shown in FIG. 1, but not restricted thereto, the direction of flow of material from the raw batch state, i.e., batch cover 18, to the refined molten glass state, i.e., molten glass 20, is vertical. Energy, in the form of heat, (Joule effect) is applied in the melting process electrically by means of multiples of glass contact electrodes 34 preferably equally spaced about the periphery of the furnace in at least two vertically separated levels or tiers. The melting zone of tank 10 may be defined as that generally cylindrical portion of tank 10 vertically extending from slightly above Tier I of electrodes 34 to slightly below Tier II OF ELECTRODES 34, while the generally cylindrical portion extending from slightly below Tier II of electrodes 34 to tank bottom wall 24 may be defined as the tank refining zone. The exact operational and control parameters are set forth in the two previously cited patents to McQuaid and Boettner et al.

As shown in FIG. 1 and as fully discussed in the patent to Boettner et al., batch is preferably continuously fed into the furnace and preferably completely covers the bath of molten glass, with this glass being vertically removed through the bottom center outlet. This is a very satisfactory technical arrangement because, of the generally circular symmetry of the furnace, all of the molten glass from corresponding parts of the batch-covered top surface experiences a similar time-temperature relation. Thus, the exiting glass is of uniform quality by reason of its uniform residence time from corresponding parts of the furnace.

This prior art structure (FIGS. 1 and 2), while producing glass of excellent quality, however utilized flush-mounted wall electrodes 34 that caused rather rapid erosion of furnace walls 14 because of the large $I^2R$ heating adjacent to the electrodes. Since the region of highest electrical energy concentration and highest temperature is the glass immediately in front of the electrodes, it follows that the refractory wear rate is greatest in this area. The arrows in FIG. 1 show the tendency for the convection currents to push upwardly against the batch in the vicinity of wall 14.

Figure 3:
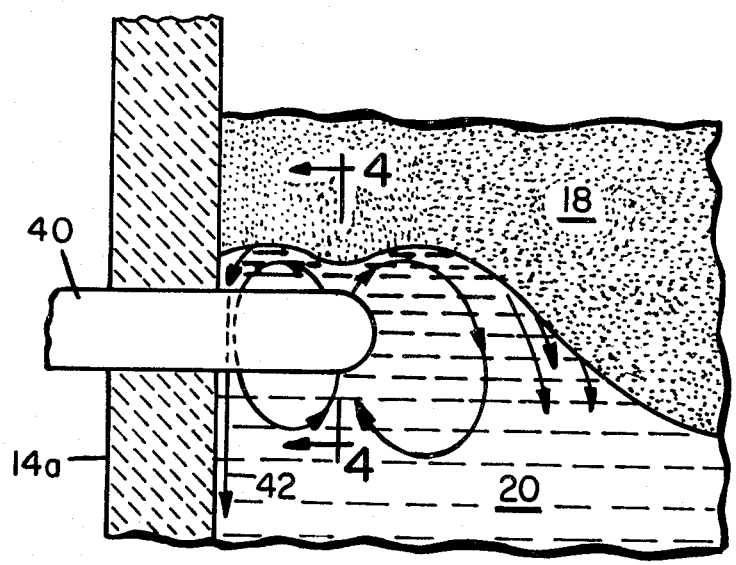
FIG. 3 is a fragmentary view of the furnace wall of FIG. 1 showing the melting process with an immersed wall electrode.

The use of axially immersed rod electrodes 40, as shown in FIG. 3, permits furnace walls 14 to remain cooler than the tips of electrodes 40 with a noticeable increase in the life of refractory walls 14. When an immersed electrode, such as electrode 40, is utilized, the motion of the convection currents can be visualized as shown in FIG. 3. If the axial immersion of electrode 40 is small (approximately that of the width dimension of the electrode), the temperature difference $(T_e-T_w)$ between the tip of the electrode $(T_e)$ and the inside of the wall $(T_w)$ will still be small enough so that any partially melted batch material (represented by arrows 42 in FIG. 3), passing down the furnace wall near the electrode, still has sufficient time and temperature to become useable glass before it exists the tank.

It has been recognized that immersing the electrodes too far (somewhat greater than the width dimension of the electrode), will cause a deleterious convection current that would drag cold, or partially-melted batch material down the furnace wall and thereby produce unsatisfactory glass. This problem can be overcome by either increasing the electrode temperature or by limiting the pull rate of the furnace. Neither of these solutions is satisfactory since a temperature increase adversely affects the furnace wall wear rate and the limiting of the furnace pull rate (to increase the glass residence time) is economically unsound.

It is not intended that the exact amount or degree of axial immersion of the electrodes be a limitation on the invention about to be described herein, since the degree of immersion is subject to several variables, such as electrode shape, operating temperature, glass composition, etc. For example, in one instance, a 6 inch diameter rod electrode used in melting a Corning Code 7740 borosilicate-type PYREX brand glass was found to be immersible up to a maximum depth of about 7 ½ inches (with the temperature difference [$T_e - T_w$] being about 130° C), before the convection current started to drag cold or partially-melted batch material down the furnace wall near the electrode to such a degree that the exiting glass was of unsatisfactory quality. Thus, with reference to the above-noted example, all electrode immersion depths over about 7 ½ inches (for 6 inch diameter electrodes) prior to this invention, either required an increase in electrode temperature or decrease in glass pulling rate in order to produce saleable glass.

Figure 4:
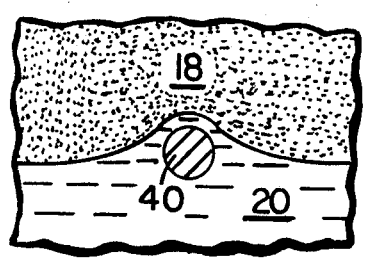
FIG. 4 is a sectional view taken along line 4—4 of FIG. 3.
Figure 4A:
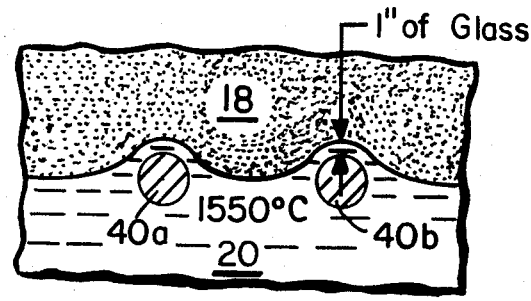
FIG. 4a is a view similar to that of FIG. 4 but showing two adjacent electrodes in the same horizontal plane.

As noted, FIG. 3 is a fragmentary view of the furnace wall of FIG. 1 showing the melting process with an immersed wall electrode 40 and having the undesirable condition of having raw or partially melted batch material (represented by arrow 42) passing down furnace wall 14a in the vicinity of where the electrode emerges therefrom. FIG. 4 shows the enveloping action of batch 18 around single electrode 40, with only a thin layer of molten glass 20 extending above the electrode. FIG. 4a, which is a view similar to that of FIG. 4, shows two adjacent electrodes 40A and 40B in the same horizontal plane. In an actual trial (with reference to the structure of FIG. 4a) it was determined that the layer of molten glass directly above the adjacent electrodes was only about one inch thick and that the temperature of the molten glass was about 1,550° C. As can be seen in FIG. 4a, batch 18 tends to fill into the region between adjacent electrodes 40A and 40B, with this filling-in tending to reduce the power being applied locally therein, which in turn causes an undesirable lowering of the fusion line near the furnace wall (midway between the electrodes) and an undesirable increase in the resistance of the 40A-40B electrode circuit.

The present invention is an improvement over the previously described prior art melting furnaces in that it actually permits an increased melting rate at a decreased melting temperature with significantly less refractory wall wear.

Figure 5:
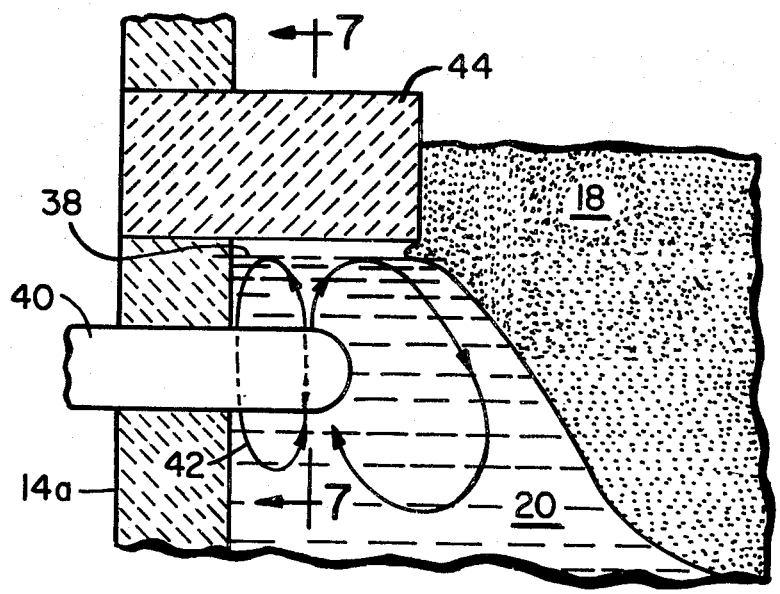
FIG. 5 is a fragmentary sectional view similar to that of FIG. 3 but utilizing the deflector of this invention.
Figure 6:
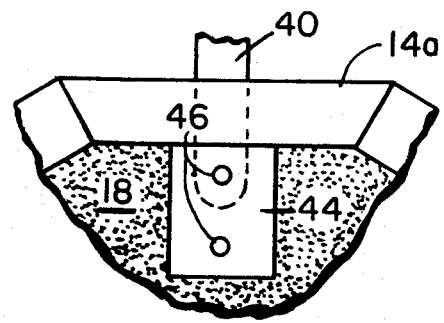
FIG. 6 is a fragmentary top plan view of the electrode and deflector of FIG. 5.
Figure 7:
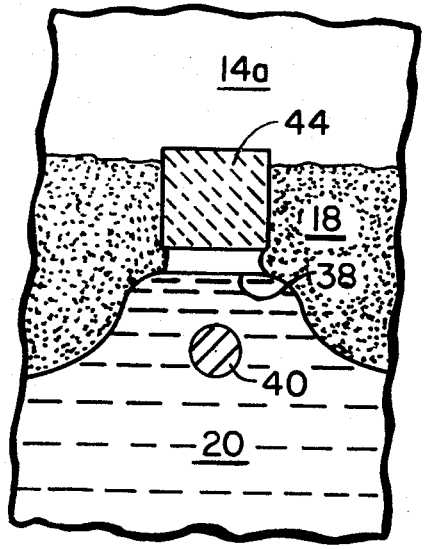
FIG. 7 is a sectional view taken along line 7—7 of FIG. 5.

One of the preferred embodiments of the novel deflector means of this invention is shown in FIGS. 5-7. FIG. 5 is a fragmentary sectional view similar to that of FIG. 3 but incorporating deflector means 44 which is shown in the form of a block of material extending through electrode wall 14a above single electrode 40 and above glass or hydrostatic head line 38 of molten glass 20. FIG. 6, which is a fragmentary top plan view of deflector means 44, shows that the block may be provided with one or more vertical apertures 46 which may be used as visual viewing ports or may serve to contain temperature-detection means, such as a thermocouple, or a glass line level detector if desired. Deflector means 44 is preferably vertically aligned with electrode 40 and should have a width dimension of at least as great as that of the electrode. In addition, although the immersion depth of deflector means 44 may be slightly less than, it preferably is slightly greater than, that of the electrode.

Figure 6A:
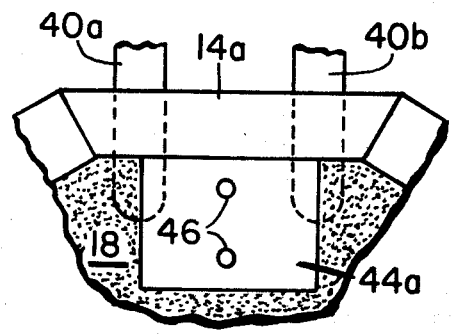
FIG. 6a is a view similar to that of FIG. 6 but showing two adjacent electrodes in the same horizontal plane.
Figure 7A:
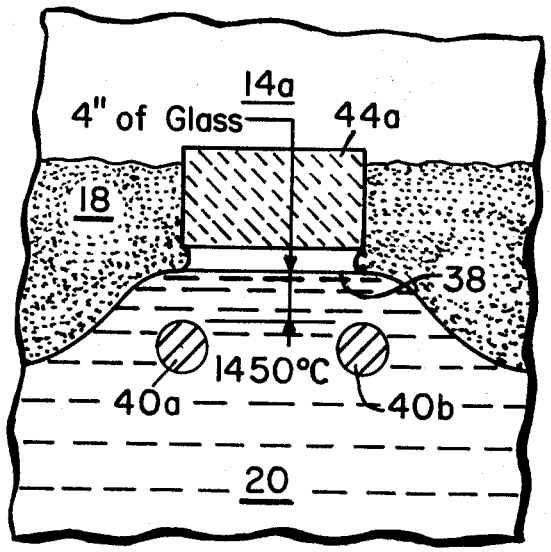
FIG. 7a is a view similar to that of FIG. 7 but showing two adjacent electrodes in the same horizontal plane.

FIGS. 6a and 7a show deflector means 44a which is substantially similar to deflector means 44 except that it has a width dimension at least as large as the center-center distance of a pair of horizontally adjacent electrodes 40A and 40B or the center-center distance of the outermost electrodes if there is a cluster of electrodes. A comparison of the prior art embodiment of FIG. 4a and the addition of deflector means 44a in FIG. 7a, shows the improvement obtained by use of the deflector means. Under actual operating conditions, i.e., at identical pull rates, the use of deflector means 44a resulted in an operating temperature that was 100° C lower (1,450° C vs. 1,550° C) thus resulting in lower tank wall wear. In addition, the layer of molten glass (fusion or hydrostatic head line) agove the electrodes increased 3 inches (4 inches vs. 1 inch). Furthermore, batch 18 is prevented from filling in the region between adjacent electrodes 40A and 40B, and raw or partially melted batch is kept from passing down furnace wall 14a in the vicinity from whence the electrodes emerge therefrom.

It should further be noted that the axial immersion depth of the various deflector means need not necessarily be greater than that of the horizontally-disposed electrodes. In the case of a single electrode, such as shown in FIGS. 5-7, the deflector need be immersed only the extent of keeping the wall-directed convection current from picking up raw or partially-melted batch and dragging it toward wall 14a. The wall-directed convection current, which generally occurs in the vicinity of the tip of the electrode, is not a serious problem with very deeply immersed horizontal-disposed electrodes and therefore the deflector means for a single electrode need not necessarily extend for the full axial immersed length of this electrode.

In the case of pairs or clusters of horizontally-disposed electrodes it is however preferable to have the immersion depth of the deflector means approximately the same or slightly longer than that of the electrodes in order to prevent batch filling in the region between these electrodes.

A comparison of FIGS. 3 and 5, as well as FIGS. 4 and 7 (or FIGS. 4a and 7a) show the benefits conferred by the use of novel deflector means 44, namely:

1. deflecting raw batch away from the electrodes;
2. substantially preventing incompletely-melted batch from being convected toward the furnace wall area from whence the electrode emerges therefrom;
3. preventing envelopment of the electrodes by batch (or filling in the region between adjacent electrodes), thereby allowing better energy dissipation;
4. self-regulation in that new batch enters the zone under the deflector only as melting or convection creates a void and allows the head of batch surrounding it to force in more material;
5. raising the layer of molten glass (fusion line) above the electrodes thereby reducing the possibility of electrode oxidation;
6. reducing the operating temperature while maintaining an identical pull rate;
7. reducing furnace wall wear rate by reducing the opeating temperature, thereby significantly increasing furnace life; and
8. increasing electrode life by allowing lower temperature operation.

Figure 8:
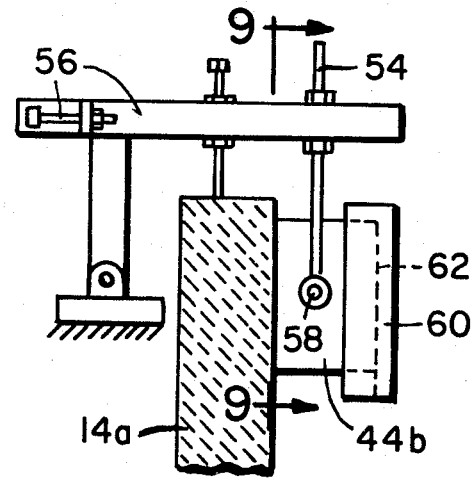
FIG. 8 is a fragmentary sectional view of a melting tank wall utilizing another embodiment of the deflector of this invention.
Figure 9:
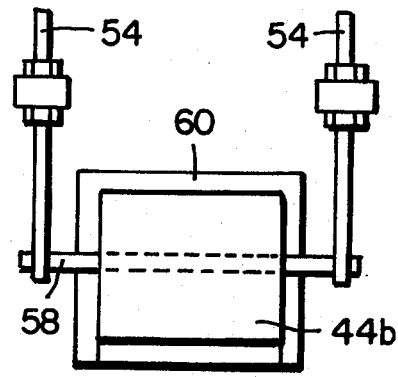
FIG. 9 is a sectional view taken along line 9—9 of FIG. 8.

FIGS. 8 and 9 show a deflector means 44b which is substantially similar to previously described deflector means 44 and 44a, except that deflector means 44b is completely adjustable both vertically and horizontally. Deflector means 44b is suspended from a framework 52 that has both vertical and horizontal adjustment means 54, 56 respectively, with the former being attached to a support member 58 passing through deflector means 44b. It should be noted that deflector means 44 and 44a while being readily adjustable horizontally can also be adjusted vertically, which however requires reworking of furnace walls 14a. The complete adjustability of suspended deflector means 44b even allows hot repairs if needed.

Deflector means 44b, which like deflector means 44, 44a is of refractory block construction, is shown with a linear member 60 that envelopes at least the axial inner end face 62 of deflector means 44b. Liner member 60 which protects the deflector means against the abrasiveness of batch material 18 is preferably constructed of an abrasion resistant material such as wood or rubber.

Figure 10:
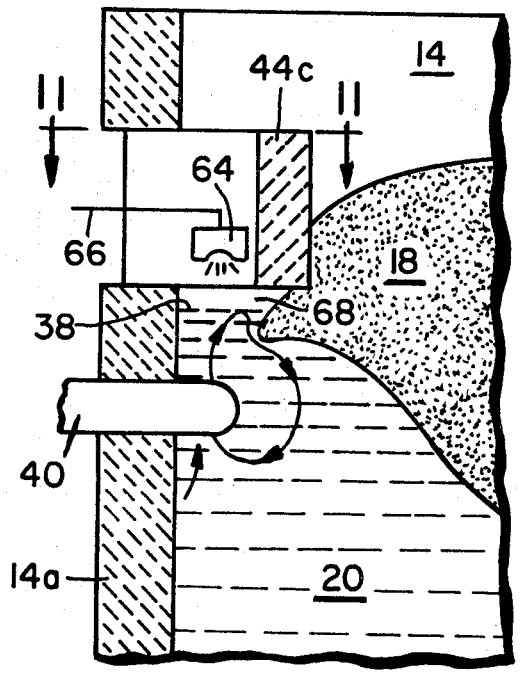
FIG. 10 is a fragmentary vertical sectional view similar to that of FIG. 5 but utilizing yet another embodiment of the deflector of this invention.
Figure 11:
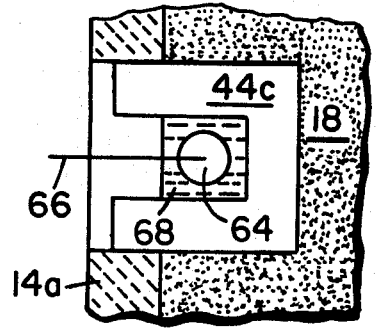
FIG. 11 is a sectional view taken along line 11—11 of FIG. 10.

FIGS. 10 and 11 show yet another embodiment 44c of the deflector means of this invention. Deflector means 44c has a generally rectangular U-shape (when seen in a plan view, such as FIG. 11), with the outardly-extending open side permitting the insertion of a conventional radiant gas burner 64 that is connected via line 66 to a source of gas (not shown). Radiant burner 64, which is downwardly-directed to an open area 68 of molten glass 20 directly vertically above electrode 40, insures that this area remains in a molten state, i.e., that a molten pool of glass is maintained above electrode 40. The maintenance of this molten pool prevents the movement of raw or partially melted batch down along wall 14a at the electrode, since even if some batch (for example at high pull rates) would be dragged toward wall 14a above electrode 40, this batch would be melted by burner 64. Another important benefit of open areas 68 of molten glass 20 is that they permit melting tank 10 to "breathe," i.e., they prevent the "bridging over" of the tank, which in turn helps to maintain a constant molten glass level.

Figure 12:
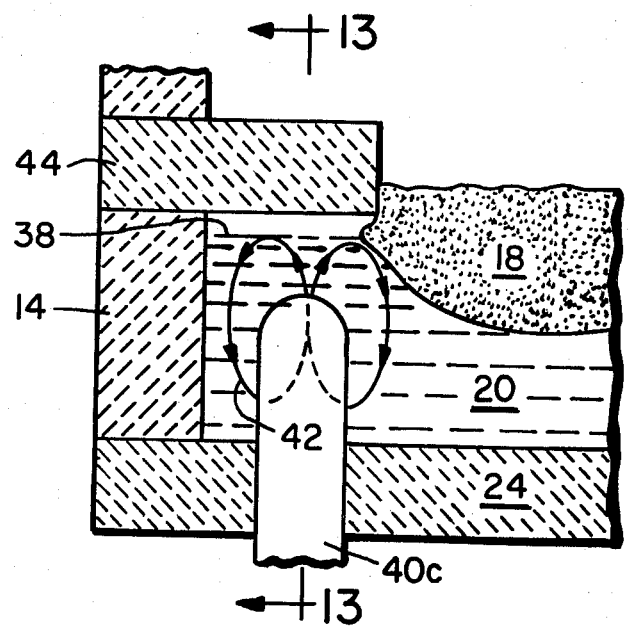
FIG. 12 is a fragmentary sectional view of a furnace wherein the deflector of this invention is used with a vertical electrode.
Figure 13:
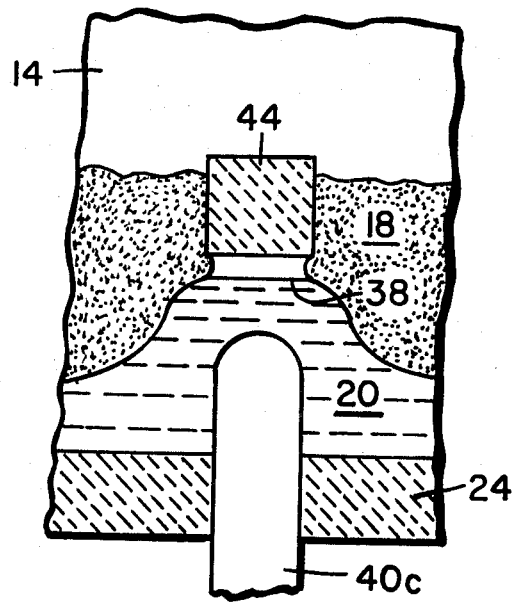
FIG. 13 is a sectional view taken along line 13—13 of FIG. 12.

FIGS. 12 and 13 show yet another use for the deflector means of this invention, namely, in combination with a vertically disposed electrode 40C. For example, electrode 40C, which may be substantially similar to electrode 40, may extend upwardly through furnace bottom wall 24 into molten glass 20. Extending inwardly through wall 14, normal to electrode 40C, is deflector means 44 (previously discussed with reference to FIGS. 5–7). Deflector means is preferably vertically aligned with vertically disposed electrode 40C and need be immersed only to the extent of keeping the wall-oriented convection current from picking up and dragging raw or partially melted batch toward wall 14. This immersion distance preferably is not less than the distance that the vertical centerline of immersed electrode 40C is normally removed from the inner surface of wall 14. Preferably the immersion depth of deflector means 44 is slightly greater than that noted hereinabove in order to keep out the raw or partially-melted batch material that is introduced around deflector means 44 by the force of gravity. As best shown in FIG. 13 the inwardly-directed convection current emanates from approximately the vertical centerline of electrode 40C.

It should be noted that all of the embodiments of the deflector means of this invention (44, 44a, 44b, 44c) can be mounted so as to be completely adjustable (like deflector means 44b). In addition, all of the embodiments can be provided with apertures 46 (like deflector means 44), and all embodiments could be provided with a liner member 60 (like deflector means 44b).

It should also be noted that these deflector means do not have to be placed in the form of a continuous ledge around the entire perimeter of the melting tank since placement above the upper-most electrodes (in the case of horizontally disposed electrodes) will suffice. The material composition of the various deflector means is not critical since, with the exception of deflector means 44c, the deflector means are not heated and none are in actual contact with the molten glass itself. It is however preferable to use a material that would be compatible with and dissolve in the glass if for some reason the deflector means were to accidentally fall into the tank.

Although several of the various deflector means of this invention have been described with reference to a vertical melting tank, they are not restricted thereto and may readily be used in a horizontal-type melting furnace where batch or raw material completely covers the molten glass surface. In addition, these deflector means may be used with both vertical and horizontally-disposed electrodes.

While the invention has been described in connection with possible forms or embodiments thereof, it is to be understood that the present disclosure is illustrative rather than restrictive and that further changes or modifications may be resorted to without departing from the spirit of invention or scope of the claims which follow.

We claim:
1. The combination of a furnace for melting and refining thermoplastic material, including:
   $a_1$. a tank having a plurality of cooperating walls and a bottom;
   $a_2$. batch feeder means for supplying batch to substantially completely cover an upper part of said tank with solid batch;
   $a_3$. means for supplying energy around the periphery of said tank to melt said material in a first part of said tank thus forming a melting zone, said energy supplying means including a plurality of spaced electrodes immersed in said molten material;
   $a_4$. a second part of said tank forming a refining zone, for refining said material subsequent to being melted in said melting zone; and
   $a_5$. outlet means formed in said tank for withdrawing said material subsequent to the melting and refining thereof; and
   b. means for deflecting batch, mounted above said immersed electrodes, adjustable in position relative to said electrodes and out of contact with said molten material, for deflecting raw batch away from said electrodes and substantially preventing incompletely-melted batch from being convected toward the furnace walls in the vicinity of said electrodes, thereby minimizing the downward convection of said raw and incompletely-melted batch.
2. The furnace of claim 1 wherein said deflector means
   a. is vertically aligned with at least one of said electrodes; and
   b. has a width dimension at least as large as the width dimension of said one electrode.
3. The furnace of claim 1 wherein said deflector means:
   a. is vertically aligned with at least two horizontally disposed and adjacent electrodes;

b. has a width dimension at least as large as the center to center distance of the outer ones of said electrodes;

c. has an immersion depth substantially as great as that of said electrodes; and d. is adjustable and in said position, such that said deflector means prevents raw and incompletely-melted batch from filling the region between said adjacent electrodes and reduces the required amount of energy applied.

4. The furnace of claim 1 wherein said deflector means:

a. is vertically aligned with at least two vertically disposed and adjacent electrodes;

b. has a width dimension at least as great as the center to center distance of the outer ones of said electrodes; and c. has an axial immersion depth at least as great as the minimum dimension from the adjacent furnace wall to the vertical centerline of one of said electrodes.

5. The furnace of claim 1 wherein:

a. said electrode is circular in cross-section;

b. the axial immersion of said electrode is greater than its diameter; and c. the axial immersion depth of said deflector means is greater than the immersion depth of said electrode.

6. The furnace of claim 1 wherein said deflector means:

a. is constructed of a material compatible with the material being melted; and b. at least the axial end face of said deflector within said tank is lined with an abrasion-resistant material.

7. The furnace of claim 1 further including radiant heating means incorporated in said deflector means for maintaining a small pool of molten material in an area directly above said electrode to prevent any partially melted batch, which may find its way into said area, from being convected downwardly near said furnace walls.

8. In a glass melting and refining furnace having a tank with a plurality of cooperating walls and a bottom, batch feeder means for supplying batch to completely cover an upper part of the tank with solid batch, electrode means for supplying energy to the tank at a plurality of heights to melt the glass in the upper or melting zone of the tank, with at least the uppermost height of said electrode means being axially immersed in said molten material, a lower or refining zone of the tank for refining the molten glass, and outlet means formed in the bottom of the tank for withdrawing the molten and refined glass, the improvement comprising the addition of means for deflecting raw batch away from said electrodes and substantially preventing incompletely-melted batch from being convected toward the furnace walls where the electrodes emerge therefrom, said deflecting means being mounted above said uppermost electrodes, said deflecting means including adjustment means making said deflection means adjustable in location relative to said electrode and said deflecting means being out of contact with said molten material, thereby minimizing the downward convection of both said raw and incompletely melted batch in the vicinity of said furnace walls.

* * * * *